Figure 1:
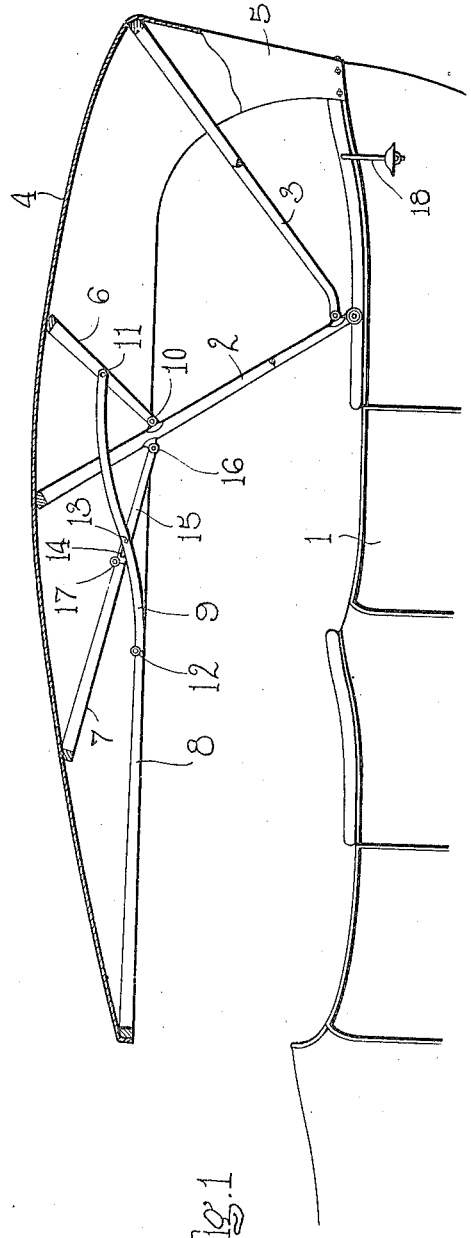

W. P. DORL.
VEHICLE TOP.
APPLICATION FILED JUNE 1, 1914.

1,157,977.

Patented Oct. 26, 1915
3 SHEETS—SHEET 1.

Witnesses
Anna M Dorr.
Chas. W. Stauffer

Inventor
Walter P. Dorl
By
Attorneys

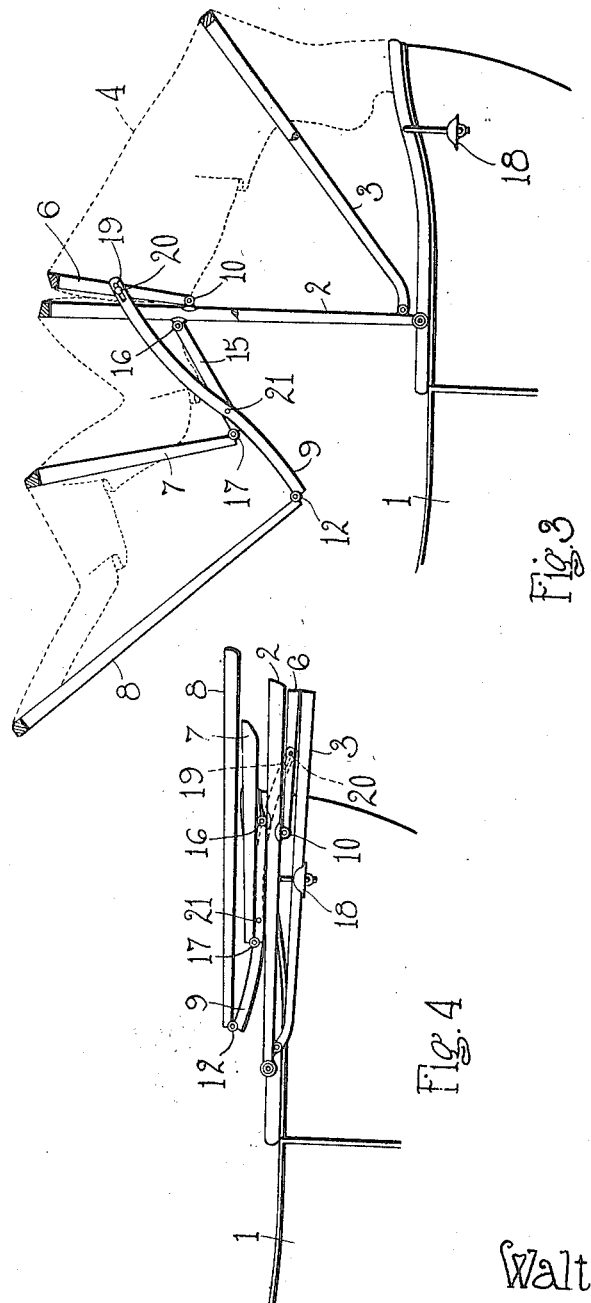

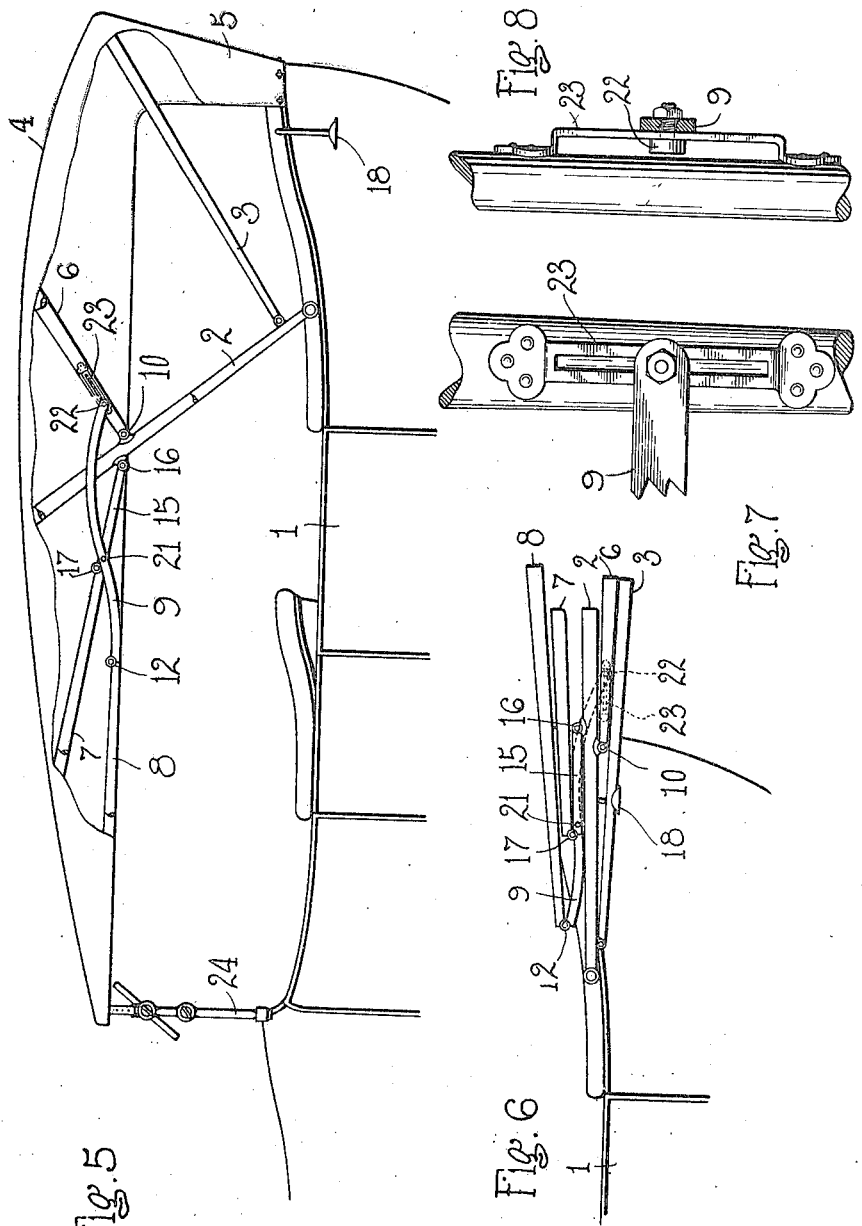

UNITED STATES PATENT OFFICE.

WALTER P. DORL, OF DETROIT, MICHIGAN, ASSIGNOR TO DORL-WILEY ONE LADY AUTO TOP CO., OF DETROIT, MICHIGAN, A CORPORATION OF MICHIGAN.

VEHICLE-TOP.

1,157,977.  Specification of Letters Patent.  Patented Oct. 26, 1915.

Application filed June 1, 1914. Serial No. 842,030.

*To all whom it may concern:*

Be it known that I, WALTER P. DORL, a citizen of the United States of America, residing at Detroit, in the county of Wayne and State of Michigan, have invented certain new and useful Improvements in Vehicle-tops, of which the following is a specification, reference being had therein to the accompanying drawings.

This invention relates to vehicle tops, and the object of my invention is to provide a top embodying a front bow, a rear bow, an intermediate bow, a supplemental bow, an outrigger bow, and arms connecting said intermediate bow, supplemental bow and outrigger bow, all of which are arranged to provide a strong and durable foldable framework for supporting a vehicle canopy or cover, in a manner that permits of the top being extended or folded with facility by one person.

How I attain the above and other objects will hereinafter appear, and reference will now be had to the drawing, wherein—

Figure 2:
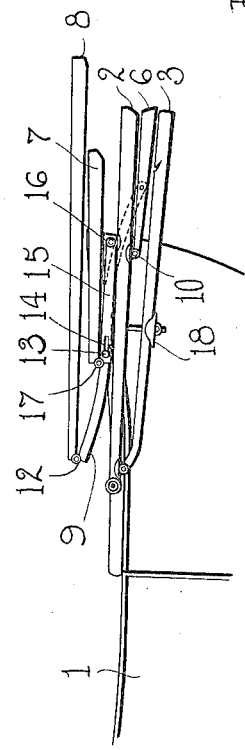

Figure 1 is a longitudinal sectional view of the vehicle top in an extended or set-up position upon a vehicle body; Fig. 2 is a side elevation of the bows of the top in a folded or collapsed position; Fig. 3 is a longitudinal sectional view of a vehicle top partly folded or collapsed, illustrating a slight modification of my invention; Fig. 4 is a side elevation of the same top completely folded or collapsed; Fig. 5 is a side elevation of a further modified form of vehicle top, partly broken away and in an extended or set-up position; Fig. 6 is a side elevation of the same top folded or collapsed; Fig. 7 is an enlarged side elevation of a portion of an intermediate bow illustrating in detail a member thereof, and Fig. 8 is a front elevation of the same partly in section.

In describing my invention by aid of the views above referred to, I desire to point out that I intend the same as merely illustrative of an example whereby my invention may be applied in practice, as I do not care to limit my invention to the precise arrangement and construction of parts shown. The following description is therefore to be broadly construed as including substitute arrangements and constructions which are the obvious equivalent of those illustrated.

In the drawings, 1 denotes a portion of an automobile body and supported in the ordinary and well known manner adjacent the rear seat of the body is a front bow 2. Pivotally connected to the front bow 2, contiguous to the ends thereof, is a rear bow 3, the bows 2 and 3 constituting the main support of a cover or canopy 4. This cover or canopy is of a conventional form having a back stay 5, and coöperating with the bows 2 and 3 in supporting the cover is an intermediate bow 6, a supplemental bow 7, an outrigger bow 8, and side arms 9.

The intermediate bow 6 has the ends thereof pivotally connected, as at 10, to the rear side of the front bow 2 and the rear ends of the arms 9 are pivotally connected, as at 11, to the intermediate bow 6. The arms 9 are described upon a compound curve and the forward ends of said arms have a rule joint connection or hinge 12 with the ends of the outrigger bow 8. The arms are arranged at the inner sides of the bow 2 and intermediate the ends of said arms are outwardly extending pins or studs 13 that extend into slots 14 provided therefor in links 15 forming part of the supplemental bow 7. The links 15 are pivotally connected to the front side of the front bow 2, in proximity to the ends of the intermediate bow 6, as indicated at 16, and the outer ends of the links 15 have rule joint connections or hinges 17 that permit of the supplemental bow being easily broken down and folded.

All of the bows are connected to the cover 4 and the vehicle body 1 as the ordinary and well known type of rests 18 for supporting the top when folded or collapsed. In folding or collapsing the top, it is only necessary to push upwardly upon the outrigger bow 8, which movement gives the supplemental bow 7 sufficient impetus to break down and in so doing, the intermediate bow 6 is shifted into proximity to the front bow 2. This is accomplished by the manner in which the side arms 9 are connected to the various bows, and the slots 14 of the links 15 avoid any binding action as the top is completely folded or collapsed and assumes the position shown in Fig. 2.

All of the bows and their connections are properly proportioned and by reason of their novel arrangement it is possible for one person to quickly extend or fold the top.

In Figs. 3 and 4, there is illustrated a slight modification of the invention, wherein the rear ends of the arms 9 are slotted, as at 19, and loosely held by pins or studs 20 in engagement with the intermediate bow 6. The arms 9 are pivotally connected to the links 15, as at 21, and instead of having a loose connection at this point, as in the preferred form of construction, the loose connection is made between the intermediate bow 6 and the arms 9. With all of the bows properly proportioned, this form of top folds just as readily as the preferred form.

A further modification is illustrated in Figs. 5 to 8 inclusive, and instead of slotting the rear ends of the arms 9, said arms are provided with studs or bolts 22 that ride in a longitudinal slotted member 23 secured in spaced relation to the intermediate bow 6. This is simply another manner of insuring positive action of all of the bows when folding, and this modification brings forth another fact, that is, that the forward end of the top can be supported by a windshield 24 or suitably connected to the vehicle.

What I claim is:

In a vehicle top, a front bow, an intermediate bow pivotally supported thereby, a supplemental break down bow pivotally supported by said front bow, an outrigger bow, and means connecting said outrigger bow and said intermediate bow and having a sliding connection with said supplemental bow whereby said bows can be folded relative to said front bow.

In testimony whereof I affix my signature in presence of two witnesses.

WALTER P. DORL.

Witnesses:
   LEWIS E. FLANDERS,
   ANNA M. DORR.